UNITED STATES PATENT OFFICE.

MAX SCHLAUGK, OF HANOVER, GERMANY.

PROCESS OF PRESERVING HYDROGEN PEROXID SOLUTION.

992,265.  Specification of Letters Patent.  Patented May 16, 1911.

No Drawing.  Application filed January 12, 1911.  Serial No. 602,134.

*To all whom it may concern:*

Be it known that I, MAX SCHLAUGK, residing at Hanover, in the Kingdom of Prussia and the German Empire, have invented certain new and useful Improvements in Processes for the Preservation of Aqueous Hydrogen Peroxid Solutions, of which the following is a specification.

It is well known that aqueous solutions of hydrogen peroxid decompose very quickly. In order to prevent such decomposition it has been suggested that acids like sulfuric acid, hydrochloric acid, phosphoric acid, acetic acid, oxalic acid and others be added to the solution. The addition of such acids does not, however, result in a complete preservation of the solutions. Whenever the hydrogen peroxid molecule commences to split up, the decomposition proceeds very rapidly so that the solution after a few weeks contains merely traces of hydrogen peroxid. Apart from that, the addition of acids prevents or interferes with the general application of such hydrogen peroxid solutions. With a view to avoiding that disadvantage small quantities of acylamids or acylimids or uric acid have been added to the aqueous solutions of hydrogen peroxid. No doubt, some beneficial effect was thus attained, inasmuch as the hydrogen peroxid could be kept undecomposed for a greater length of time, but the success was not complete. I have now found that hydrogen peroxid solutions may be preserved undecomposed for a greater length of time than heretofore by the addition of small quantities of paraäcetylamidophenol and the addition of that substance to the solution forms the object of the present application.

The addition of paraäcetylamidophenol has the great advantage that not only the hydrogen peroxid can be kept undecomposed for a longer time but its disinfecting property is also increased whereby such solutions become specially suitable in dentistry and for cosmetic purposes. It has also been proposed to employ eiconogen for the preservation of hydrogen peroxid. The eiconogen is the sodium salt of an amidonaphtholsulfonic acid and experiments have shown that in its effect it comes next to the paraäcetylamidophenol. However, the latter has the advantage compared with the eiconogen that it does not discolor the hydrogen peroxid solution, whereas the eiconogen produces such discoloration.

Comparative experiments specially made with some of the best known means for the preservation of hydrogen peroxid solutions have proved beyond doubt the increased efficiency of the paraäcetylamidophenol.

As a rule an addition of 1 gr. of paraäcetylamidophenol to 1 liter of 10 vol. % hydrogen peroxid solution is quite sufficient to keep the solution practically undecomposed for about six months.

What I claim is:—

1. A process for the preservation of aqueous solutions of hydrogen peroxid consisting in adding to those solutions a small quantity of paraäcetylamidophenol.

2. The herein described process for the preservation of aqueous solutions of hydrogen peroxid which consists in adding approximately one gram of paraäcetylamidophenol to one liter of approximately 10% volume hydrogen peroxid solution.

In testimony whereof I affix my signature in presence of two witnesses.

MAX SCHLAUGK.

Witnesses:
 OTTO WITTENBERG,
 RUDOLF SCHMIDT.